US010361878B1

(12) United States Patent
Loreille (10) Patent No.: US 10,361,878 B1
(45) Date of Patent: Jul. 23, 2019

(54) SYSTEM, METHOD, AND COMPUTER PROGRAM FOR INITIATING ACTIONS AUTOMATICALLY ON SMART DEVICES THAT ARE IN A HOME

(71) Applicant: Amdocs Development Limited, Limassol (CY)

(72) Inventor: Matthieu Loreille, Opio (FR)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 400 days.

(21) Appl. No.: 15/194,475

(22) Filed: Jun. 27, 2016

Related U.S. Application Data (60) Provisional application No. 62/185,516, filed on Jun. 26, 2015.

(51) Int. Cl.
*H04L 12/28* (2006.01)
*H04L 29/08* (2006.01)
*G05B 19/042* (2006.01)

(52) U.S. Cl.
CPC ........ *H04L 12/2816* (2013.01); *G05B 19/042* (2013.01); *H04L 67/125* (2013.01); *G05B 2219/2642* (2013.01)

(58) Field of Classification Search
CPC .............. G05B 19/0426; H04M 11/04; H04M 1/72538; H04M 1/2725
USPC .......................................................... 700/90
See application file for complete search history.

(56) References Cited

U.S. PATENT DOCUMENTS

| 8,107,625 | B2 | 1/2012 | Boland et al. |
| 8,350,694 | B1 | 1/2013 | Trundle et al. |
| 8,825,043 | B2 | 9/2014 | Rogalski et al. |
| 9,361,011 | B1 * | 6/2016 | Burns ............... G06F 17/30825 |
| 2006/0205384 | A1 | 9/2006 | Chang |
| 2009/0070681 | A1 | 3/2009 | Dawes et al. |
| 2013/0215266 | A1 * | 8/2013 | Trundle ........... G08B 13/19602 348/143 |

(Continued)

FOREIGN PATENT DOCUMENTS

| CA | 2704244 A1 | 11/2011 |
| EP | 2683146 A1 | 1/2014 |
| GB | 2500488 A | 9/2013 |

(Continued)

*Primary Examiner* — Chun Cao
(74) *Attorney, Agent, or Firm* — Zilka-Kotab, P.C.

(57) ABSTRACT

A system, method, and computer program product are provided for initiating actions automatically on smart devices that are in a home. In use, one or more smart devices connected to a common network are identified. Additionally, an alert trigger signal is sent to put the one or more smart devices on alert to be ready to perform one or more specific actions in response to an action trigger signal. Further, an event defined as an event for initiating the one or more smart devices to perform the one or more specific actions is detected. In addition, an action trigger signal is sent to the one or more smart devices to initiate the one or more specific actions associated with the one or more smart devices, the one or more specific actions including at least one of video recording or a transmission of measurements. Data resulting from the one or more specific actions is stored automatically on one or more cloud-based servers. Furthermore, a time of the detected event is logged.

8 Claims, 4 Drawing Sheets

(56) References Cited

U.S. PATENT DOCUMENTS

2015/0161856 A1* 6/2015 Wilson .................... G08B 3/10
340/392.1
2015/0350611 A1* 12/2015 Pearson ................. H04L 67/10
348/158

FOREIGN PATENT DOCUMENTS

WO     2014092464 A1   6/2014
WO     2014159131 A2   10/2014

* cited by examiner

SYSTEM, METHOD, AND COMPUTER PROGRAM FOR INITIATING ACTIONS AUTOMATICALLY ON SMART DEVICES THAT ARE IN A HOME

CLAIM OF PRIORITY

This application claims the benefit of U.S. Provisional Application No. 62/185,516, filed Jun. 26, 2015, the entire contents of which are incorporated herein by reference.

FIELD OF THE INVENTION

The present invention relates to initiating actions automatically on smart devices that are in a home.

BACKGROUND

Smart devices are becoming ubiquitous in homes. Tablets, computers, and smartphones are already common, but devices such as smart vacuum cleaners, connected refrigerators, and connected televisions, etc. are now available and waiting to replace other existing non-intelligent appliances. When end users are away, these objects are idle, underutilized.

There is thus a need for addressing these and/or other issues associated with the prior art.

SUMMARY

A system, method, and computer program product are provided for initiating actions automatically on smart devices that are in a home. In use, one or more smart devices connected to a common network are identified. Additionally, an alert trigger signal is sent to put the one or more smart devices on alert to be ready to perform one or more specific actions in response to an action trigger signal. Further, an event defined as an event for initiating the one or more smart devices to perform the one or more specific actions is detected. In addition, an action trigger signal is sent to the one or more smart devices to initiate the one or more specific actions associated with the one or more smart devices, the one or more specific actions including at least one of video recording or a transmission of measurements. Data resulting from the one or more specific actions is stored automatically on one or more cloud-based servers. Furthermore, a time of the detected event is logged.

DETAILED DESCRIPTION

Figure 1:
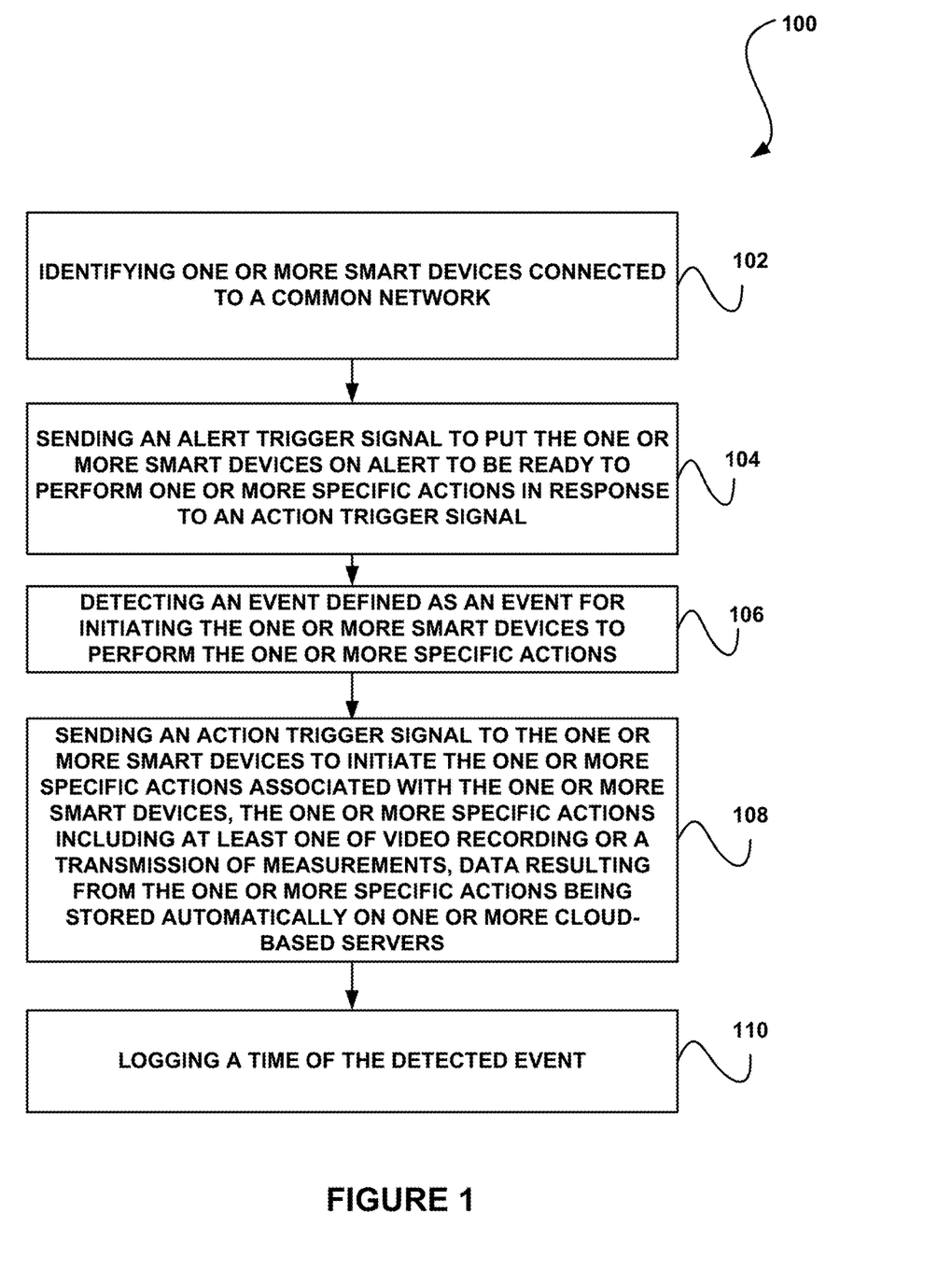
FIG. 1 illustrates a method for initiating actions automatically on smart devices that are in a home, in accordance with one embodiment.

FIG. 1 illustrates a method 100 for initiating actions automatically on smart devices that are in a home, in accordance with one embodiment.

As shown, one or more smart devices connected to a common network are identified. See operation 102. The network may include a wired or wireless network and may be associated with various protocols (e.g. Wi-Fi, Bluetooth, etc.).

The smart devices may include any type of device or appliance in a home, such as a computer, a mobile phone, a tablet computer, a sensor, a washer/dryer, a refrigerator, a vacuum cleaner, an Internet enabled television, a music player, etc. The smart devices may include various sensors, such as cameras, accelerometers, thermometers, GPS devices, and/or microphones, etc.

A smart device refers to a device connected to a common home network (wireline or wireless) that exposes capabilities/sensors through the common network. These capabilities can be utilized by a wider smart home system, even if the native purpose of that device was not to serve a smart home system.

For example, the camera of a connected TV could be on-boarded by the smart home system as a video surveillance camera even if the purpose of the TV camera was more to do video calls and not video surveillance.

Each of the smart devices may include a control application (or plug-in, etc.) for allowing a system (e.g. a connected home service system, etc.) to instruct the one or more smart devices to perform various actions.

As shown further in FIG. 1, an alert trigger signal is sent to put the one or more smart devices on alert to be ready to perform one or more specific actions in response to an action trigger signal. See operation 104. The alert trigger signal may include any data capable of being utilized to put the one or more smart devices on alert. The signal may be associated with various communication protocols (e.g. based on the type of smart device, etc.).

Further, an event defined as an event for initiating the one or more smart devices to perform the one or more specific actions is detected. See operation 106. The event may include any type of event, such as motion detection, motion detection in a particular zone, sound detection, sensor alerts, temperature changes, movement of the device, and/or various other events.

In addition, an action trigger signal is sent to the one or more smart devices to initiate the one or more specific actions associated with the one or more smart devices. See operation 108. In this case, the one or more specific actions include at least one of video recording or a transmission of measurements.

Of course, various other actions may be initiated, such as location determination functionality (e.g. GPS functionality, etc.), audio recording, etc. The transmission of measurements may include the transmission of any data, such as the transmission of GPS data, the transmission of temperature data, and the transmission of velocity/acceleration data, etc. Data resulting from the one or more specific actions is stored automatically on one or more cloud-based servers (or any network database, memory, system, etc.).

Furthermore, a time of the detected event is logged. See operation 110. The time of the event may be logged on the cloud-based servers. Such cloud-based servers may be associated with a connected home service and/or various other systems/services.

Thus, the method 100 may be implemented such that mobile phones and tablets (and their embedded sensors and cameras), etc. may be used to collect extra data, given a specific event, that can then be uploaded to the cloud. For example, in the case of an intrusion detected by a security system, the tablets may be instructed to start video recordings (e.g. by the security system or another system, etc.).

As another example, if the devices detect they are being moved around (e.g. using accelerometer sensors, etc.), the devices can notify the security system (or any other controlling system). Additionally, GPS functionality of the devices may be activated so that there is hope that the escape route followed by a thief (likely to steal the tablet) can be monitored. In one embodiment, this can be done utilizing a mobile application (or plugin, etc.) installer on tablets and smartphones (such that the application has access to the sensors of these tablets, etc.).

For example, the mobile application associated with accessing functionality of the smart devices may be installed on the devices such that a central system (e.g. a security system, a connected home service system, etc.) can access and/or communicate with such devices. Such central system may include, for example, one or more servers, databases, etc. In one embodiment, such central system may be associated with a connected home service or a security service.

It should be noted that the method 100 may be implemented utilizing various systems, hardware, software, applications, user interfaces, etc., as dictated by the implementer. For example, in one embodiment, the method 100 may be implemented by a system associated with a connected home service. In another embodiment, the method 100 may be implemented by a master device. For example, a smart device of a user may be designated as a master device and may implement the method 100 while communicating with other devices utilizing a master/slave communication protocol, etc.

It should be noted that although the method 100 refers to in-home devices, such method may be implemented in the context of any organization, office, building, area, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
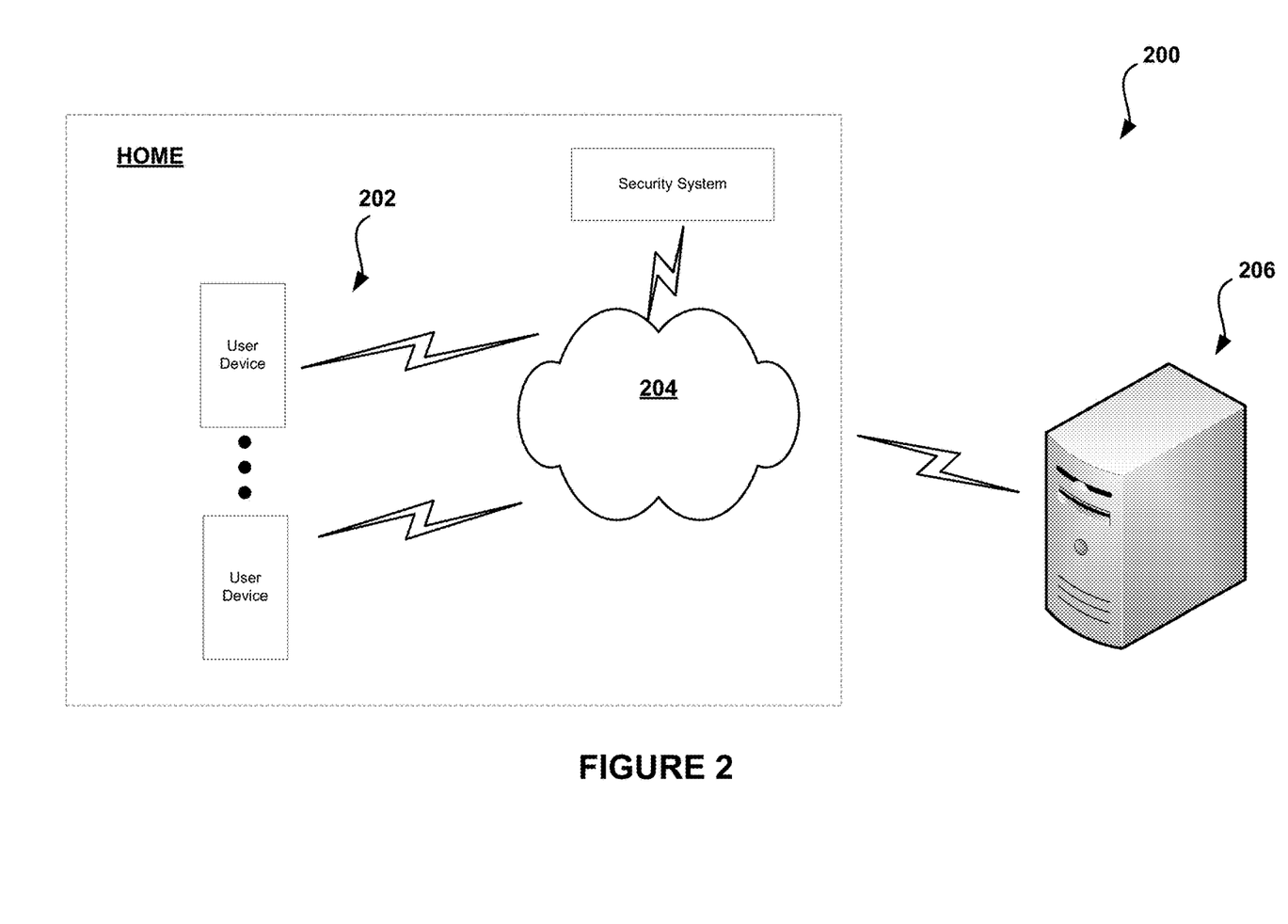
FIG. 2 illustrates a system for initiating actions automatically on smart devices that are in a home, in accordance with one embodiment.

FIG. 2 illustrates a system 200 for initiating actions automatically on smart devices that are in a home, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, one or more home-based smart devices 202 may be in communication with one or more cloud-based servers/systems 206 over one or more networks 204. In operation, the home-based smart devices 202 may be directed (e.g. by the cloud-based servers/system 206) to perform one or more actions in response to one or more detected events (e.g. detected by the devices 202, a security system, sensors, etc.).

The system 200 uses computing/recording devices that are left in the home to become part of the overall security solution. Based on what the devices can perform (e.g. capabilities, processing power available, etc.), each device may be assigned a role by a security solution (e.g. the server 206 and an application on the devices 202, etc.) and grow the number of devices used for monitoring a home.

For example, devices with a camera (e.g. tablets, smartphones, cars in the garage or near the house, etc.) could perform video recording in the case of a detected intrusion. Those devices with a built-in GPS chipset may also track the location of the device in case of theft.

Additionally, devices with various sensors (e.g. heat sensors, water leak sensors, etc.) may report an alert to the alarm system when needed, rather than keep the information for their onboard screen when they are operating normally. As a result, all of these smart objects could grow the "army" of security devices and increase the accuracy of the overall security solution for detecting real intrusions or hazards (and avoid false positive alerts).

In operation, the system 206 may identify one or more smart devices 202 connected to the common network 204. This identification may be in response to the devices 202 being powered on, an application being initiated (e.g. a monitoring application on the devices 202), a monitoring schedule, motion detection, and/or various other triggers. In one embodiment, the devices 202 may have a monitoring software application installed that allows communication with the system 206 and further allows control/monitoring capabilities to be exploited by the system 206.

The system 206 sends an alert trigger signal to the devices 202 to put the smart devices 202 on alert to be ready to perform one or more specific actions in response to an action trigger signal (e.g. motion detection, etc.). An event defined as an event for initiating the one or more smart devices to perform the one or more specific actions is detected. In various embodiments, the devices 202 may perform this detection or the system 204 may perform this detection.

For example, in one embodiment, the user devices 202 may relay event information (e.g. motion, temperature, device movement, etc.) and the system 206 may determine/detect whether the event defined is an event for initiating the one or more smart devices 202 to perform the one or more specific actions. In another embodiment, the user devices 202 (i.e. a software application associated therewith) may determine/detect whether the event defined is an event for initiating the one or more smart devices 202 to perform the one or more specific actions.

The events that are defined as an event for initiating the one or more smart devices 202 to perform the one or more specific actions may be defined in the system 206 and/or on the devices 202. Moreover, in one embodiment, events may be defined as actionable events by a user (e.g. of the devices 202) using an online application associated with the system 206 for defining rules associated with detected events.

In addition, an action trigger signal is sent by the system 206 to the one or more smart devices 202 to initiate the one or more specific actions associated with the one or more smart devices 202. The one or more specific actions may include video recording or a transmission of measurements/data (e.g. temperature data, velocity data, acceleration data, location data, etc.), etc.

In one embodiment, the actions instructed to be performed by the smart devices 202 may further include calculating their positions by triangulation relative to each other, when there are more than two such smart devices. This allows the system 206 to better estimate the location of burglars inside a home, as accurate timed events and location of devices that recorded the events can be gathered.

The system 206 stores data resulting from the one or more specific actions automatically on one or more cloud-based servers. Furthermore, a time of the detected event is logged by the system 206. Thus, data associated with an actionable event may be stored off site from the home, in a secure location.

In one embodiment, the system 206 may upload some software code (e.g. plug-ins, etc.) into any smart devices connected to the same network (e.g. LAN, etc.) so that the device can perform the desired actions (e.g. video/audio recording, GPS tracking, temperature monitoring, etc.). In this case, the software code (e.g. the plug-ins, etc.) will not replace the main software code of the smart devices 202, only add specific features on top of existing features.

In one embodiment, once a smart device is identified (e.g. make, model, version, etc.), a software code (e.g. a plug-in, etc.) may be fetched from a storage server associated with the system 206 and may be uploaded to the smart device 202. In another embodiment, the smart device 202 may be instructed to fetch the software itself, depending on its capacity to access the Internet. In yet another embodiment, the software (e.g. the plug-in, etc.) may be pushed to the smart device 202 by the system 206.

The system 206 may initiate various actions based on various established or defined use cases. As an example, the system 206 may instruct the devices 202 to coordinate and mutualize assets. For example, a device with local storage capacity can collect data from other devices and wait until the main Internet access is available in order to upload that data to the cloud (i.e. to the system 206).

As another example, if there are several devices with storage capacity, data can be replicated among them. Therefore, if a burglar takes away one of the devices, data can still be uploaded at a later time.

As another example, the system 206 may instruct all devices with cameras to perform video recordings (triggered by a common event). As another example, the system 206 may instruct devices with loudspeakers to play warning messages (e.g. as thief deterrence, fire alerts, welcome/ greetings, etc.).

As another example, the system 206 may instruct devices that control an electrical load (e.g. a light, etc.) to turn on and off with a well-known pattern (e.g. Morse code for SOS, etc.) to drag attention from neighbors or people nearby. Of course, various actions/scenarios may be defined by the user (e.g. using a user interface associated with the system 206).

It should be noted that, in one embodiment, a security system (e.g. a local or remote security system) may perform the functionality of the system 206.

Figure 3:
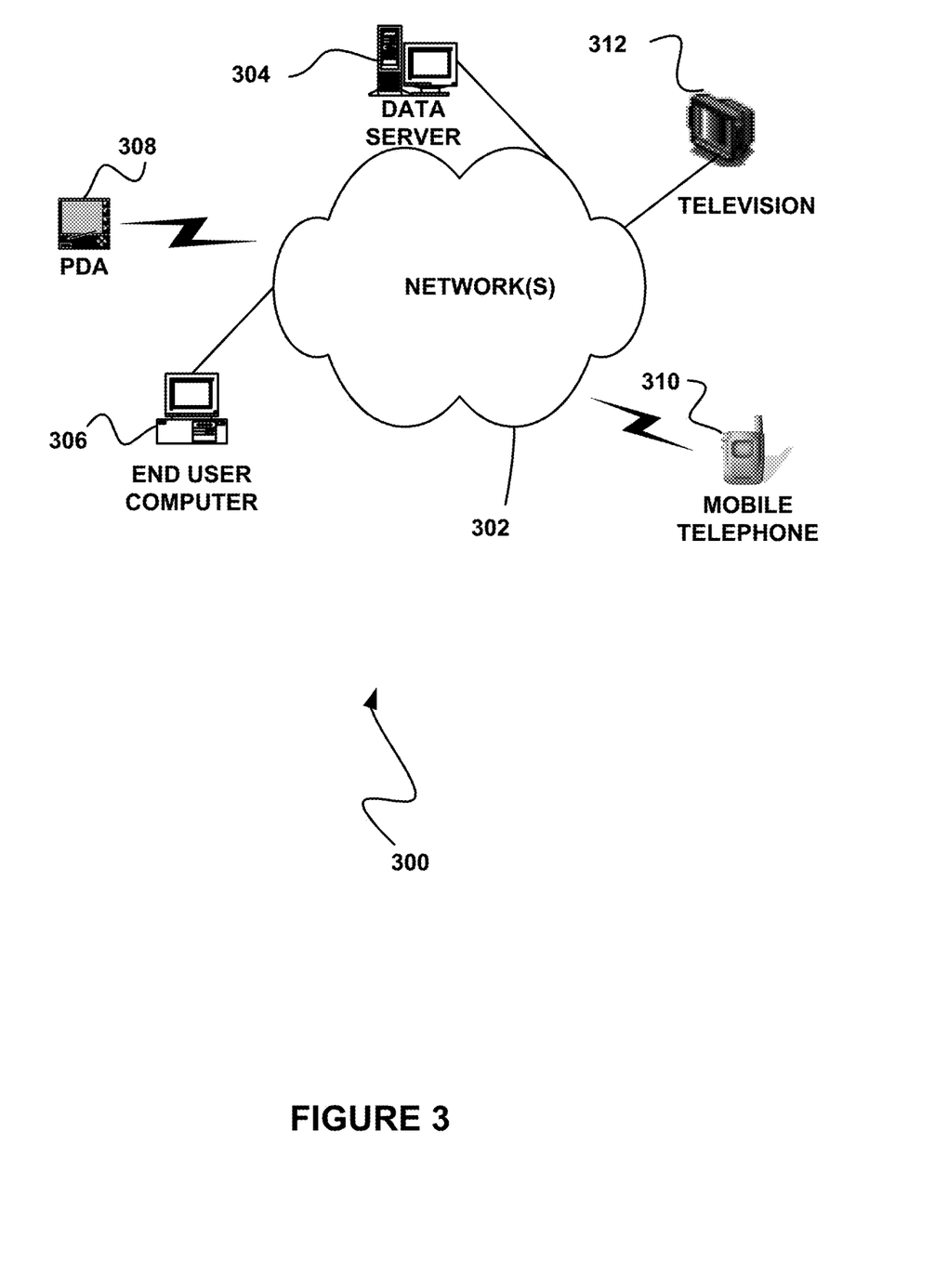
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
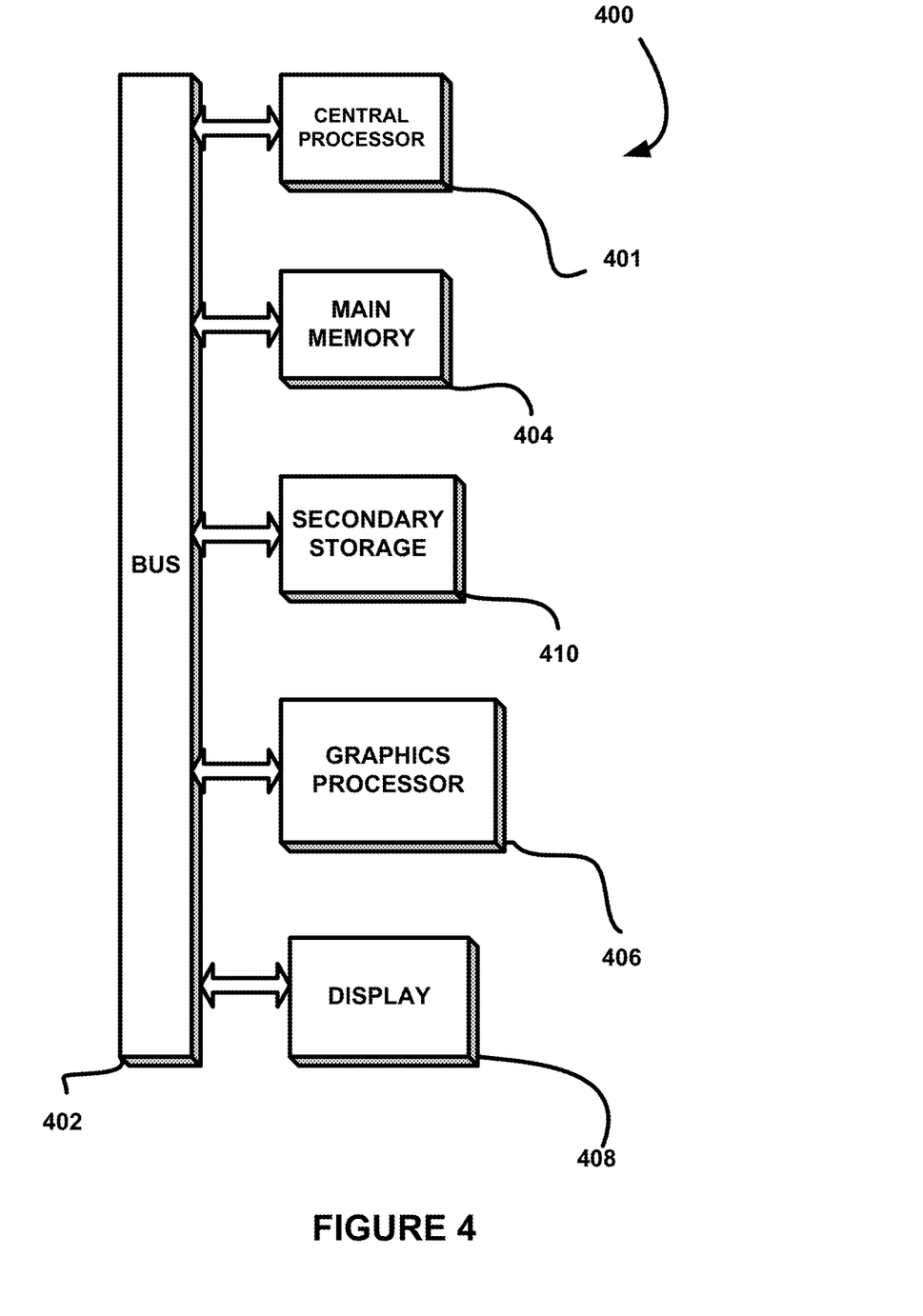
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:
    detecting, by a system, a plurality of smart devices connected to a common network, the plurality of smart devices including:
        a mobile user device having at least one movement sensor for sensing movement of the mobile user device and global positioning system sensor for sensing a location of the mobile user device, and
        at least one video recording device having a camera to perform video recording;
    causing, by the system, an application to be installed on the plurality of smart devices, the application controlling notifications sent to the system by the plurality of smart devices and functionality of the plurality of smart devices;
    sending, by the system to the application installed on the at least one video recording device, an alert trigger signal to put the at least one video recording device on alert to be ready to perform one or more specific actions in response to an action trigger signal;
    receiving, by the system from the application installed on the mobile user device, notification of an event defined as an event for initiating the at least one video recording device to perform video recording, the event including movement of the mobile user device sensed by the at least one movement sensor of the mobile user device;
    responsive to receiving the notification, sending, by the system to the application installed on the at least one video recording device, an action trigger signal to initiate the at least one video recording device to perform video recording, wherein data resulting from the video recording is stored automatically on one or more cloud-based servers; and
    logging, by the system, a time of the received notification.

2. The computer program product of claim 1, wherein the at least one video recording device includes a television having the camera to perform video recording.

3. The computer program product of claim 1, wherein the at least one video recording device includes a tablet having the camera to perform video recording.

4. The computer program product of claim 1, wherein the movement of the mobile user device is sensed by an accelerometer of the mobile user device.

5. The computer program product of claim 1, wherein GPS functionality of the mobile user device is activated responsive to the movement of the mobile user device being sensed by the at least one movement sensor of the mobile user device, for tracking a location of the mobile user device.

6. The computer program product of claim 1, further comprising:

responsive to receiving the notification, sending, by the system to the application installed on the mobile user device an instruction to use triangulation to calculate a position of the mobile user device relative to other smart devices of the plurality of smart devices.

7. A method, comprising:
detecting, by a system, a plurality of smart devices connected to a common network, the plurality of smart devices including:
- a mobile user device having at least one movement sensor for sensing movement of the mobile user device and global positioning system sensor for sensing a location of the mobile user device, and
- at least one video recording device having a camera to perform video recording;

causing, by the system, an application to be installed on the plurality of smart devices, the application controlling notifications sent to the system by the plurality of smart devices and functionality of the plurality of smart devices;

sending, by the system to the application installed on the at least one video recording device, an alert trigger signal to put the at least one video recording device on alert to be ready to perform one or more specific actions in response to an action trigger signal;

receiving, by the system from the application installed on the mobile user device, notification of an event defined as an event for initiating the at least one video recording device to perform video recording, the event including movement of the mobile user device sensed by the at least one movement sensor of the mobile user device;

responsive to receiving the notification, sending, by the system to the application installed on the at least one video recording device, an action trigger signal to initiate the at least one video recording device to perform video recording, wherein data resulting from the video recording is stored automatically on one or more cloud-based servers; and logging, by the system, a time of the received notification.

8. A system, comprising one or more processors, for:
detecting, by the system, a plurality of smart devices connected to a common network, the plurality of smart devices including:
- a mobile user device having at least one movement sensor for sensing movement of the mobile user device and global positioning system sensor for sensing a location of the mobile user device, and
- at least one video recording device having a camera to perform video recording;

causing, by the system, an application to be installed on the plurality of smart devices, the application controlling notifications sent to the system by the plurality of smart devices and functionality of the plurality of smart devices;

sending, by the system to the application installed on the at least one video recording device, an alert trigger signal to put the at least one video recording device on alert to be ready to perform one or more specific actions in response to an action trigger signal;

receiving, by the system from the application installed on the mobile user device, notification of an event defined as an event for initiating the at least one video recording device to perform video recording, the event including movement of the mobile user device sensed by the at least one movement sensor of the mobile user device;

responsive to receiving the notification, sending, by the system to the application installed on the at least one video recording device, an action trigger signal to initiate the at least one video recording device to perform video recording, wherein data resulting from the video recording is stored automatically on one or more cloud-based servers; and logging, by the system, a time of the received notification.

* * * * *